UNITED STATES PATENT OFFICE 2,539,394

METHOD FOR SEPARATING ALDEHYDES FROM A MIXTURE OF ORGANIC COMPOUNDS

George B. Arnold, Glenham, N. Y., and Howard V. Hess, Charleston, W. Va., assignors to The Texas Company, New York, N. Y., a corporation of Delaware No Drawing. Application February 27, 1947, Serial No. 731,402

11 Claims. (Cl. 260—601)

This invention relates to the separation and isolation of aldehydes from a mixture of organic compounds. More specifically, the invention discloses a process whereby aldehydes are expeditiously separated from a mixture of organic compounds and are recovered in monomeric form from the separation medium.

In our co-pending application, Serial No. 722,844 filed January 17, 1947, for improvements in Method for the Separation of a Heterogeneous Mixture of Compounds, we have described a combination process involving catalytic conversion of CO and $H_2$ into a product comprising hydrocarbons and oxygen-containing compounds including organic acids, alcohols, aldehydes and ketones, esters, and the treatment of the resulting conversion product to recover these constituents separately therefrom. The present application is directed broadly to the recovery of aldehydes from mixtures containing them and other oxygen-containing compounds, particularly those previously mentioned, by treatment with ammonia.

In accordance with the method of the invention, a mixture of organic compounds containing aldehydes is connected with ammonia at an elevated temperature and at a pressure sufficient to maintain substantially liquid phase conditions with the result that aldehydic components of the mixture are converted to aldehyde-ammonia complexes. Aldehyde-ammonia complexes are separated from the mixture of organic compounds and aldehydes are regenerated from the aldehyde-ammonia complexes substantially in the monomeric form, that is, without appreciable polymerization, by decomposing the complexes with either heat or acid.

We have found that aldehydes are completely converted to aldehyde-ammonia complexes when a mixture of aldehydes and other oxygen-containing compounds is contacted with ammonia at a temperature in the range of 150 to 300° F. and preferably at 200 to 225° F. and at a pressure falling in the range of 100 to 500 pounds per square inch, the pressure employed being sufficient to maintain substantially liquid phase conditions within the contacting zone. When the mixture of organic compounds is contacted with ammonia at temperatures lower than about 150° F., there is incomplete conversion of the aldehydes to aldehyde-ammonia complexes. When the contact is effected at a temperature falling within the specified range and under sufficient pressure to maintain substantially liquid phase conditions, the residual mixture of organic compounds gives a negative test with Schiff's reagent after the aldehyde-ammonia complexes have been removed.

The method of the invention is particularly useful in the separation and recovery of aldehydic components from a mixture of organic compounds comprising such components as alcohols, ketones, hydrocarbons, esters and aldehydes. A representative source of such a mixture is the catalytic hydrogenation of carbon monoxide to form gasoline hydrocarbons employing an iron catalyst at temperatures in the range of 550 to 750° F. and at pressures in the range of 150 to 300 pounds per square inch; in such a process, there is formed, in addition to gasoline hydrocarbons, a considerable quantity of oxygen-containing compounds amounting to from 10 to 20 volume per cent of the liquid hydrocarbon phase. The isolation and recovery of oxygenated compounds from such a mixture is important from two aspects: first, the oxygenated compounds are economically valuable in their own right; secondly, the presence of oxygenated compounds in the hydrocarbon product is generally undesirable. The method of this invention provides a method whereby aldehydic components can be removed from such a product mixture in such a manner that they may be regenerated and recovered in substantially monomeric form.

One of the outstanding features of this invention is the fact that aldehydes are recovered from the aldehyde-ammonia complexes in substantially monomeric form, that is, without appreciable polymerization of the aldehydes to dimers, trimers, etc. According to normal expectations, aldehyde-ammonia complexes would be unstable and prone to polymerize.

Acidic components, when present in the mixture of organic compounds, will also react with ammonia at the conditions of temperature and pressure specified in the invention to form ammonium salts of organic acids. Aldehyde-ammonia complexes and ammonium salts of organic acids separate as a composite from the residual components of the mixture. The recovery of aldehydes from the composite mixture is readily effected by subjecting the composite to steam distillation whereby aldehyde-ammonia complexes decompose and aldehydes distill as aldehyde-water azeotropes; thereafter aldehydes can be separated from the azeotropic distillate. Since aldehydes may be readily separated from the ammonium salts of organic acids in this fashion, the method of the invention is applicable even when the mixture of organic compounds contains acidic components.

As a matter of fact, in the resolution of a mixture of organic compounds into component fractions, the fact that treatment with ammonia concomitantly removes both aldehydes in the form of aldehyde-ammonia complexes and organic acids in the form of ammonium salts is an advantageous attribute. For treatment with ammonia at elevated temperature and pressure removes two constituents of the organic mixture in the form of a composite which is readily resolved into two fractions, one comprising aldehydes, the other comprising acids.

Either anhydrous ammonia or a concentrated aqueous ammonia containing about 20 to 28 per cent ammonia by weight may be used to effect removal of aldehydes from the solution of oxygen-containing compounds at the conditions of temperature and pressure specified in this invention. With either reagent, substantially complete removal of aldehydes is effected; as illustrative of this fact, a hydrocarbon solution of oxygen-containing compounds such as is obtained from the catalytic conversion of carbon monoxide and hydrogen gives a negative test with Schiff's reagent when either anhydrous ammonia or a concentrated aqueous ammonia is employed.

Anhydrous or substantially anhydrous ammonia is a preferred reactant because its use means that only about one-third the amount of reagent has to be handled; further, there is less tendency for low boiling alcohols which are present in the solution of oxygen-containing compounds to dissolve in anhydrous ammonia than in concentrated aqueous solution.

The decomposition of aldehyde-ammonia complexes is readily effected. The aldehyde-ammonia complexes which are usually in the form of a heavy viscous oil can be subjected to treatment with acid or to steam distillation or may be merely heated at atmospheric pressure to a temperature of about 200 to 450° F. to effect decomposition. Steam distillation effects the decomposition of the aldehyde-ammonia complexes so that liberated ammonia and aldehyde-water azeotropes distill overhead; upon condensation of the aldehyde-water azeotropes, aldehydes are separated from the water fraction of the azeotropic condensate, either by phase separation if the aldehydes are insoluble in the aqueous phase, or by use of a suitable solvent if water-soluble aldehydes such as acetaldehyde and propionaldehyde are present. Heating the aldehyde-ammonia complexes to about 200–450° F. at atmospheric pressure also results in their decomposition with liberation of ammonia; ammonia distills overhead from the heated mixture and the more volatile aldehydes are condensed upon the cooling surfaces provided within the decomposition vessel. Treatment of the ammonia complex with dilute inorganic acid results in its decomposition with the formation of free aldehyde and an ammonium salt.

The selection of the method of decomposition depends upon the circumstances; for example, if the mixture of organic oxygen-containing compounds contains organic acids as well as aldehydes, the composite comprising aldehyde-ammonia complexes and ammonium salts of organic acids is usually decomposed by steam distillation for thereby conversion of ammonium salts of organic acids to amides is prevented.

In order that the invention may be more fully understood, there will now be described in detail the treatment of a hydrocarbon solution of oxygen-containing compounds such as is obtained from the catalytic conversion of synthesis gas directed mainly towards the production of gasoline hydrocarbons. As was pointed out previously, it is desirable to remove the oxygen-containing compounds from the hydrocarbon product of such conversion because the oxygen-containing compounds are valuable in themselves and also because their presence is usually undesirable in the hydrocarbon product, whose contemplated use is as a fuel for combustion engines.

The product of the catalytic conversion of carbon monoxide and hydrogen directed mainly towards the formation of gasoline hydrocarbons and employing an iron type catalyst comprising about 94 per cent iron, about 2 to 6 per cent alumina and 0.5 to 2 per cent potassium oxide at a temperature of about 550 to 750° F. and at a pressure of about 150 to 300 pounds per square inch in a fluidized dense phase type of conversion, usually contains about two volumes of water to about one volume of hydrocarbon phase.

Separation of the hot conversion product stream into a hydrocarbon phase and an aqueous phase at an elevated temperature in the range of about 175 to 300° F. and at a pressure of about 150 to 300 pounds per square inch results in displacement of a substantial portion of the low boiling oxygen-containing compounds from the aqueous phase to the hydrocarbon phase; this displacement proves advantageous because the oxygen-containing materials are more readily treated for their resolution into component classes according to functional group when the oxygen-containing materials are dissolved in the hydrocarbon phase.

Accordingly, after the product of synthesis gas conversion is separated into a hydrocarbon phase and a water phase at a temperature in the range of 200 to 300° F. and at a pressure in the range of about 150 to 300 pounds per square inch, the entire hydrocarbon phase, in the absence of the water phase, is adjusted to a pressure falling within the range of 100 to 500 pounds per square inch and is then introduced into a vessel equipped with means of agitation such as a stirrer. This vessel is maintained at a temperature of about 150 to 300° F. and at a pressure of about 100 to 500 pounds per square inch, the pressure level depending upon the amount required to preserve substantially liquid phase conditions within the mixing vessel.

The hydrocarbon phase, separated from the aqueous phase in the manner just described, contains 5 to 20 volume per cent oxygen-containing compounds. The composition of the oxygen-containing compounds varies greatly with the operating conditions and the catalyst employed to effect the conversion of synthesis gas. However, the approximate composition of the total oxygen-containing compounds may be represented as follows:

| | Wt. per cent |
|---|---|
| Alcohols | 80 to 20 |
| Acids | 10 to 25 |
| Esters | 5 to 40 |
| Aldehydes | 3 to 8 |
| Ketones | 2 to 7 |

Ordinarily, the oxygen-containing compounds comprise mainly compounds having from 1 to 20 carbon atoms per molecule. Ethyl, normal heptyl and normal dodecyl alcohol are examples of alcohols which may be found in the synthesis product; acetic, pentanoic and undecanoic acid illustrate the type of acids which may be found in the synthesis product; ethyl acetate, methyl octanoate and ethyl dodecanoate, etc., illustrate the type of esters that may be found in the synthesis product; propanal, octanal and dodecanal are aldehydes that may be found in the synthesis product; methyl ethyl ketone and methyl n-nonyl ketone are illustrative of the ketones that may be found in the synthesis product.

There is also introduced into the mixing vessel anhydrous ammonia or a concentrated aqueous solution of ammonia containing 20 to 28 per cent ammonia by weight. In further description of the invention, it will be assumed that anhydrous ammonia has been used.

Anhydrous ammonia is added to the hydrocarbon solution of oxygen-containing compounds in the mixing vessel in an amount which is about 10 to 50 per cent in excess over the stoichiometric quantity required to react with the aldehydes and acids present in the hydrocarbon solution.

In the mixing vessel, the hydrocarbon solution and ammonia are thoroughly agitated in order to effect efficient contacting and thus secure substantially complete conversion of the aldehydic and acidic components of the solution to aldehyde-ammonia complexes and ammonium salts respectively. After thorough agitation, the reaction mixture is introduced into a settler which is advantageously maintained at conditions of temperature and pressure approximating that existing in the contacting vessel. Therein aldehyde-ammonia complexes and the ammonium salts of organic acids settle out from the hydrocarbon solution in the form of a heavy viscous oil. In order to expedite the separation, a centrifuge may be employed whereby the lighter hydrocarbon solution is quickly separated from the heavy oil comprising aldehyde-ammonia complexes and ammonium salts.

The heavy viscous oil containing the aldehyde-ammonia complexes and ammonium salts of organic acids is introduced into a vessel maintained at atmospheric pressure, wherein the oil may be subjected to either steam distillation or raised to an elevated temperature in the range of 200 to 450° F. for the decomposition of the aldehyde-ammonia complexes. If steam distillation is employed, the distillate from such operation comprises gaseous ammonia and aldehyde-water azeotropes. The aldehyde-water azeotropes are condensed thereby separating them from the ammonia portion of the distillate. The aldehyde-water azeotropic condensate separates at atmospheric temperature into two phases, namely an aldehyde phase and a water phase and aldehydes are readily separated therefrom. Low boiling water-soluble aldehydes such as acetaldehyde and propionaldehyde may be extracted from the aqueous phase by means of a water-insoluble solvent such as ether. The mixture of aldehydes may be separated into individual components by close fractionation.

The residue from steam distillation is an aqueous solution of the ammonium salts of organic acids. The ammonium salts are recovered per se by removal of the water under vacuum. Free organic acids are obtained by acidification of the aqueous solution of ammonium salts or by heating the anhydrous salts.

The recovery of aldehydes in the monomeric form from a mixture of organic compounds by contacting with ammonia at elevated temperature and pressure has been described in connection with the treatment of the product of the catalytic conversion of carbon monoxide and hydrogen. However, it must be borne in mind that the application of the invention is not necessarily limited to the treatment of the product obtained by the conversion of synthesis gas. A particularly useful characteristic of the method of the invention is that ketones are seemingly unaffected by the treatment so that the invention provides a simple means of separating aldehydes from ketones, which separation has often proved difficult because of the similar properties of the two types of compounds.

The method of the invention is also advantageously used in the resolution of the product obtained by the partial oxidation of a hydrocarbon or a mixture of hydrocarbons. Such oxidation results in a mixture of oxygen-containing compounds such as aldehydes, ketones, alcohols and acids, and the method of the invention provides a simple procedure whereby aldehydes can be separated from such a complex mixture.

Obviously many modifications and variations of the invention, as hereinbefore set forth, may be made without departing from the spirit and scope thereof and, therefore, only such limitations should be imposed as are indicated in the appended claims.

We claim:

1. A method for separating aldehydes from a mixture of acid-free organic compounds which comprises contacting said mixture with ammonia at a temperature falling within the range of 150 to 300° F. and at a pressure sufficient to maintain substantially liquid phase conditions so as to form aldehyde-ammonia complexes, separating said complexes from said mixture, and regenerating aldehydes substantially in monomeric form from said aldehyde-ammonia complexes.

2. A method for separating aldehydes from a mixture of acid-free organic compounds which comprises forming a mixture of oxygen-containing compounds which includes aldehydes and which is diluted with a hydrocarbon, contacting said mixture with ammonia at a temperature in the range of 150 to 300° F. and under a pressure sufficient to maintain substantially liquid phase conditions, forming aldehyde-ammonia complexes, separating resulting complexes from the mixture and regenerating aldehydes substantially in monomeric form from said aldehyde-ammonia complexes.

3. A method for isolating a fraction rich in aldehydes from a mixture of organic compounds which comprises forming a mixture of oxygen-containing compounds associated with hydrocarbons, said compounds including aldehydes, ketones, alcohols, esters and organic acids, contacting said mixture with ammonia at a temperature in the range of 150 to 300° F. and under a pressure sufficient to maintain substantially liquid phase conditions, forming aldehyde-ammonia complexes and ammonium salts of organic acids, separating a composite comprising aldehyde-ammonia complexes and ammonium salts of organic acids from said mixture and regenerating aldehydes substantially in monomeric form from the separated composite.

4. A method for isolating a fraction rich in aldehydes from a mixture of organic compounds which comprises forming a mixture of oxygen-containing compounds associated with hydrocarbons, said compounds including aldehydes, ketones, alcohols, esters and organic acids, contacting said mixture with ammonia at a temperature in the range of 150 to 300° F. and under a pressure sufficient to maintain substantially liquid phase conditions, forming aldehyde-ammonia complexes and ammonium salts of organic acids, separating a composite comprising aldehyde-ammonia complexes and ammonium salts of organic acids from said mixture, subjecting said composite to steam distillation whereby aldehyde-ammonia complexes are decomposed and the distillate comprises water-aldehyde azeotropes and separating aldehydes from said distillate comprising water-aldehyde azeotropes.

5. The method for isolating a fraction rich in aldehydes from a mixture of organic compounds which comprises forming a mixture comprising hydrocarbons and oxygen-containing compounds such as aldehydes, alcohols, organic acids, ketones and esters, whose composition is approximately 80 to 95 per cent hydrocarbons and 5 to 20 per cent oxygen-containing compounds, contacting said mixture with ammonia at a temperature in the range of 150 to 300° F. and under a pressure sufficient to maintain substantially liquid phase conditions, forming aldehyde-ammonia complexes and the ammonium salts of organic acids, separating a composite comprising aldehyde-ammonia complexes and ammonium salts of organic acids from said mixture and subjecting said composite to steam distillation whereby aldehyde-ammonia complexes are decomposed and the distillate comprises water-aldehyde azeotropes and separating aldehydes from said distillate comprising water-aldehyde azeotropes.

6. The method according to claim 5 in which the oxygen-containing compounds have the approximate composition on a weight basis of 80 to 20 per cent alcohols, 10 to 25 per cent acids, 5 to 40 per cent esters, 3 to 8 per cent aldehydes and 2 to 7 per cent ketones.

7. The method according to claim 5 in which the mixture comprising hydrocarbons and oxygen-containing compounds is formed by the catalytic conversion of carbon monoxide and hydrogen.

8. A method for isolating a fraction rich in aldehydes from a mixture of organic compounds which comprises contacting said mixture with ammonia at elevated temperature in the range of about 150 to 300° F. and at a pressure of about 100 to 500 pounds per square inch so as to form aldehyde-ammonia complexes, separating said complexes from said mixture and regenerating aldehydes substantially in monomeric form from said aldehyde-ammonia complexes.

9. A method for isolating a fraction rich in aldehydes from a mixture of organic compounds which comprises contacting said mixture with ammonia at elevated temperature in the range of about 150 to 300° F. and at a pressure of about 100 to 500 pounds per square inch so as to form aldehyde-ammonia complexes, separating said complexes from said mixture, treating said separated complexes with dilute inorganic acids so as to decompose said complexes and regenerate aldehydes and separating said regenerated aldehydes.

10. A method for isolating a fraction rich in aldehydes from a mixture of organic compounds which comprises contacting said mixture with ammonia at elevated temperature in the range of about 150 to 300° F. and at a pressure of about 100 to 500 pounds per square inch so as to form aldehyde-ammonia complexes, separating said complexes from said mixture, subjecting said separated complexes to steam distillation whereby aldehyde-ammonia complexes are decomposed and the distillate comprises water-aldehyde azeotropes and separating said aldehydes from said distillate comprising water-aldehyde azeotropes.

11. A method for isolating a fraction rich in aldehydes from a mixture of organic compounds which comprises contacting said mixture with ammonia at an elevated temperature at 150° F. and at a pressure sufficient to maintain substantially liquid phase conditions so as to form aldehyde-ammonia complexes, separating said complexes from said mixture and regenerating aldehydes substantially in monomeric form from said aldehyde ammonia complexes.

GEORGE B. ARNOLD.
HOWARD V. HESS.

REFERENCES CITED

The following references are of record in the file of this patent:

UNITED STATES PATENTS

| Number | Name | Date |
|---|---|---|
| 1,987,601 | Burke | Jan. 15, 1935 |

OTHER REFERENCES

Sidgwick, "Organic Chemistry of Nitrogen," 2nd ed. (1942), page 41, Oxford University Press.